United States Patent Office 3,094,976
Patented June 25, 1963

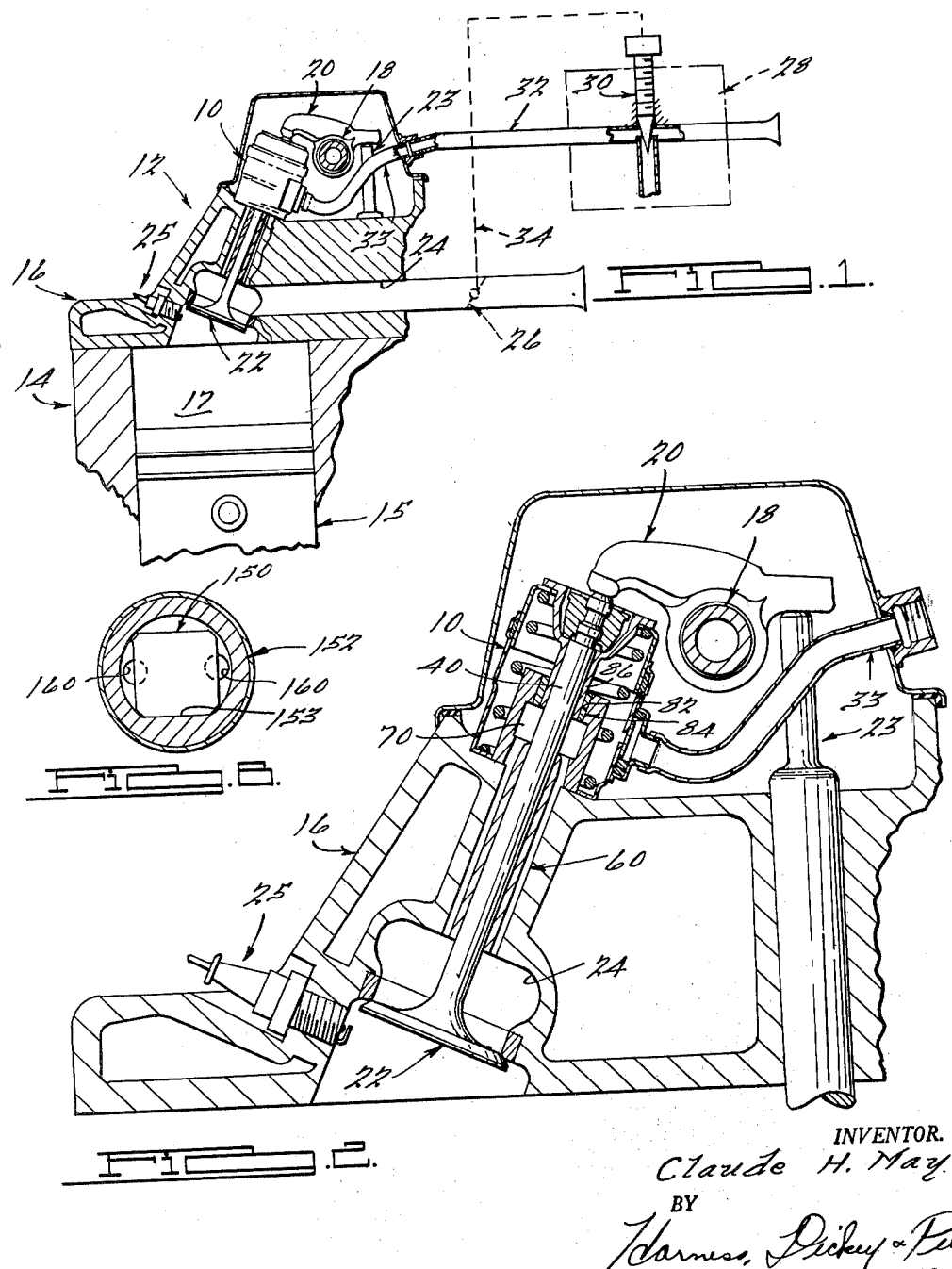

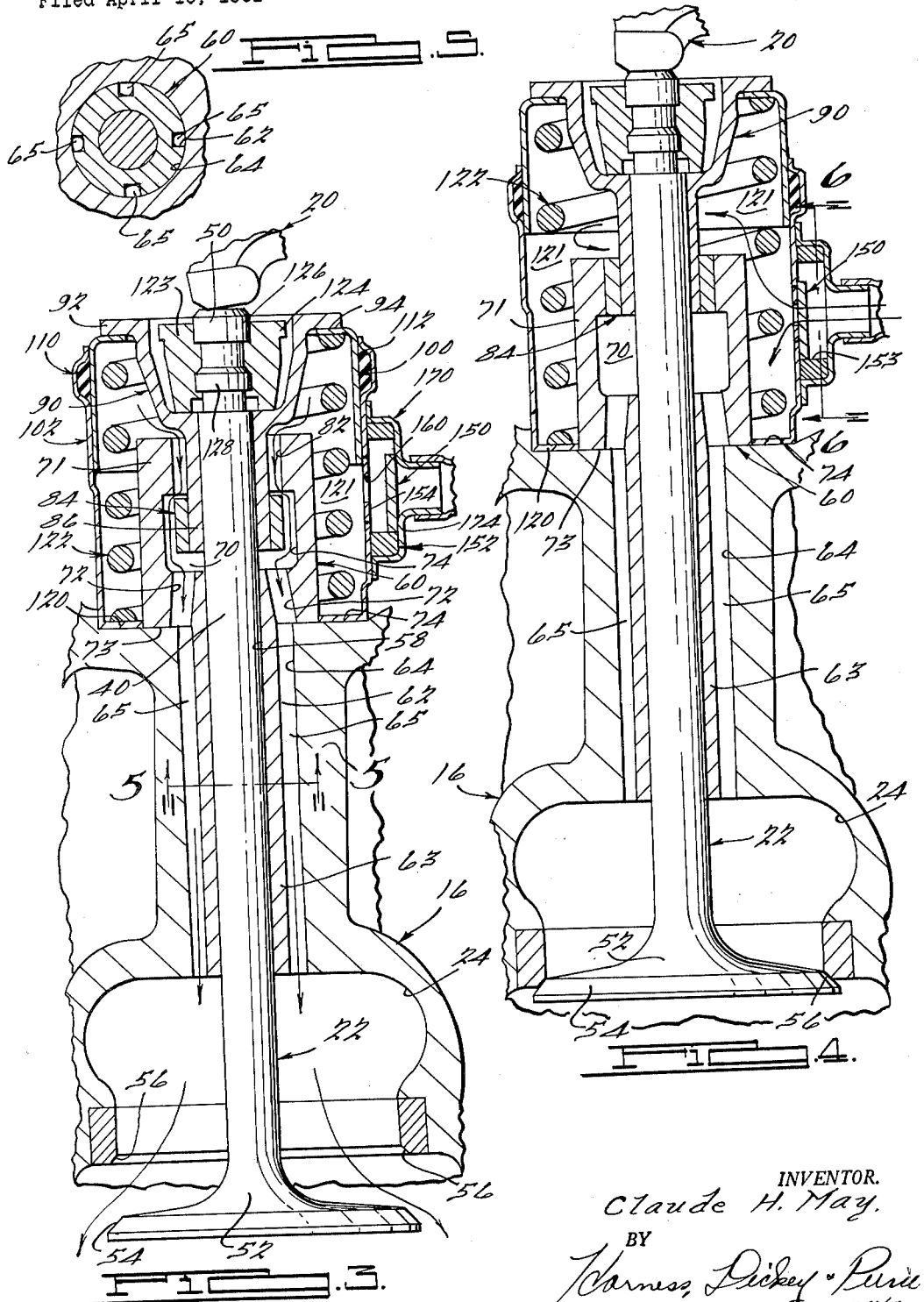

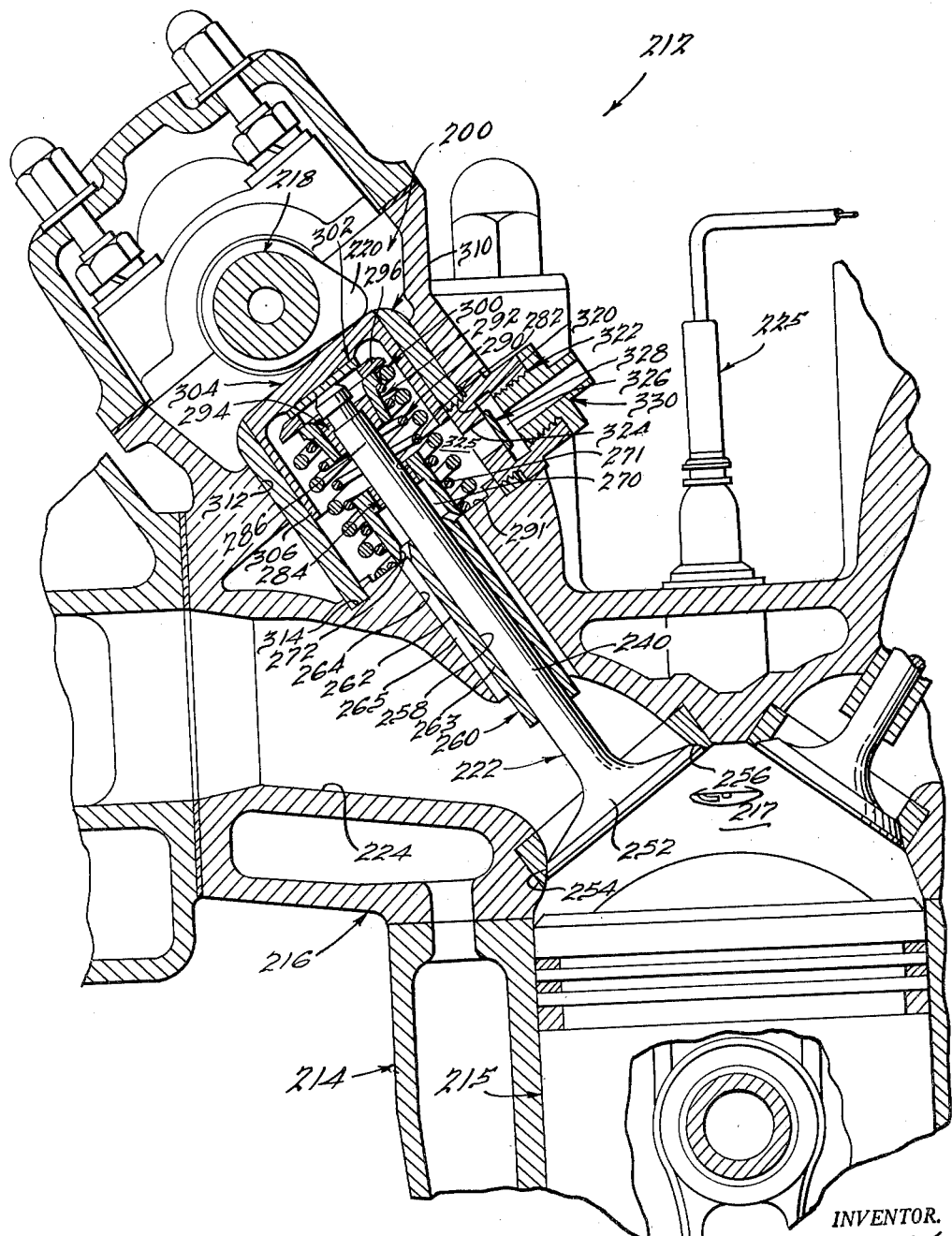

3,094,976
AUTOMOTIVE DEVICE
Claude H. May, Racine, Wis., assignor to Walker Manufacturing Company, Racine, Wis., a corporation of Delaware
Filed Apr. 19, 1961, Ser. No. 104,060
10 Claims. (Cl. 123—119)

This invention relates generally to internal combustion engines and more particularly to a fuel system for a gasoline-powered internal combustion engine.

The fuel system of a conventional gasoline-powered internal combustion engine operable on a carbureted air-fuel mixture generally represents a compromise between several diverse requirements. For example, it is desirable that the fuel intake manifold have a relatively small cross sectional area so that, at low power conditions, the relatively small quantities of air-fuel mixture required by the engine move through the intake manifold at a velocity sufficient to maintain the fuel droplets therein in suspension. Conversely, however, the intake manifold must have a sufficiently large cross sectional area to deliver relatively large quantities of air-fuel mixture without appreciable pressure loss under high speed and power operating conditions.

Attempts have been heretofore made to solve the problem presented by these seemingly irreconcilable requirements as by, for example, making the intake manifold as short as possible and minimizing bends or changes in transverse section therein to improve fluid flow therethrough. However, these expedients have not presented a wholly satisfactory solution to the aforementioned problem.

A fuel system in accordance with the present invention presents a material advance in the internal combustion engine art because no fuel is carried by the air that is inducted through the engine intake manifold thereby permitting the cross sectional area thereof to be increased to optimum dimensions without compromising the aforementioned engine idle requirements. Distribution of an air-fuel mixture to the cylinders of the internal combustion engine is accomplished by a novel air-fuel mixture injection unit that is compatible with and complementary to the relatively large cross sectional area intake manifold. A fuel system in accordance with the present invention therefore provides for relatively smooth and economical operation at idle conditions as well as relatively powerful operation at high speeds.

Accordingly, one object of the present invention is an improved fuel system for an internal combustion engine.

Another object is an improved fuel system for an internal combustion engine wherein air only is inducted through the intake manifold.

Another object is a fuel system for an internal combustion engine wherein an air-fuel mixture is injected into the combustion chamber of the engine.

Another object of the present invention is an air-fuel mixture injector for an internal combustion engine.

Other objects and advantages of the present invention will be apparent in the following specification, claims and drawings wherein:

FIGURE 1 is a diagrammatic representation of a fuel system including an air-fuel mixture injector in accordance with an exemplary embodiment of the present invention shown in association with an internal combustion engine;

FIG. 2 is a cross sectional view of the air-fuel mixture injector of FIGURE 1;

FIG. 3 is an enlarged cross sectional view of the air-fuel mixture injector of FIG. 2 shown with the injector in the injection condition and with the intake valve of the internal combustion engine in the open condition;

FIG. 4 is a view similar to FIG. 3 showing the air-fuel injector in the induction position and with the intake valve of the engine in the closed condition.

FIG. 5 is a cross sectional view taken substantially along the line 5—5 of FIG. 3;

FIG. 6 is a cross sectional view taken substantially along the line 6—6 of FIG. 4; and FIG. 7 is a cross sectional view of a modified air-fuel mixture injector shown in operative association with an internal combustion engine having overhead camshafts.

Referring to FIGURE 1 of the drawings, a fuel system in accordance with the present invention comprises an air-fuel mixture injector 10 and is shown in operative association with an internal combustion engine 12, having overhead valves operated by push-rods. The internal combustion engine 12 is of substantially conventional construction and comprises a cylinder block 14 that, in conjunction with a reciprocal piston 15 and a cylinder head 16, defines a combustion chamber 17. An overhead rocker arm shaft 18 supports a rocker arm 20 which, upon rotation, effects opening of an intake valve 22. The rocker arm 20 is operable by a conventional push rod 23 that extends into operative relationship with a cam shaft (not shown).

The cylinder head 16 includes an intake manifold 24 that is vented directly to the atmosphere so that air only is inducted therethrough under the control of a butterfly valve 26. A conventional carburetor 28 having an adjustable fuel metering jet, for example a needle valve 30, is connected to the air-fuel injector 10 as by conduits 32 and 33. It is to be noted that the butterfly valve 26 and fuel metering jet 30 in the intake manifold 24 and carburetor 28, respectively, are connected by, for example, a mechanical linkage 34 that provides for control of the fuel system, as will be described. Ignition of the air-fuel charge within the combustion chamber 17 is effected by a conventional spark plug 25.

Referring to FIGS. 2, 3 and 4, the fuel injector 10 is shown operatively disposed in coaxial telescoping relationship about a stem portion 40 of the intake valve 22. An opposite end portion 52 of the valve 22 is of conventional construction and has a truncated conical face 54 thereon for seating in a complementary valve seat 56 in the cylinder head 16.

In accordance with the present invention, the intake valve 22 is mounted for axial reciprocation within a central bore 58 of an elongated tubular valve guide 60. The valve guide 60 has a plurality of axially extending and circumferentially spaced grooves 62 on the outer periphery of a cylindrical lower end portion 63 thereof that, upon insertion of the valve guide 60 into a complementary bore 64 in the cylinder head 16, define a plurality of circumferentially spaced passages 65 extending parallel to and spaced radially outwardly of the central bore 58 therein. The passages 65 communicate with the intake manifold 24 immediately above the lower end 52 of the valve 22. The passages 65 also communicate with a valve chamber 70 in an enlarged cylindrical upper end portion 71 of the valve guide 60 through a like plurality of apertures 72.

The upper end portion 71 of the valve guide 60 defines a radial shoulder 73 that is seated on a complementary face 74 on the cylinder head 16 thereby to locate the valve guide 60 axially within the bore 64 in the cylinder head 16. The upper end portion 71 of the valve guide 60 is of relatively larger diameter than the lower end portion 63 thereof to accommodate the valve chamber 70, the radially inner peripheral wall of which is defined by a circular recess 74. The apertures 72 communicate with the bottom of the chamber 70 to provide for the passage of an air-fuel mixture downwardly and outwardly of the valve chamber 70 into the longitudinal passages 65 within the lower end portion 63 of the valve guide 60.

The upper end portion 71 of the valve guide 60 has a bore 82 aligned with the bore 58 therein for the acceptance of a complementary annular sleeve or slide valve 84 that is disposed about a lower end portion 86 of a valve spring retainer 90. As shown in FIG. 3, the valve 84 is movable downwardly completely out of the bore 82 in the upper end portion 71 of the valve guide 60 thereby to provide clearance for the passage of an air-fuel mixture through the bore 82 into the valve chamber 70. When the valve 84 is in its upper position (FIG. 4) it effects a seal with the bore 82 to preclude the passage of the air-fuel mixture into the valve chamber 70.

The spring retainer 90 has a radially outwardly extending flange portion 92 at the upper end thereof that positions and supports a radially inwardly extending upper end flange 94 on an annular plunger 100. The plunger 100 is in the form of an inverted cup that is slidably received within a complementary annular housing 102. As best seen in FIGS. 3 and 4, a slidable seal is maintained between the plunger 100 and housing 102 by an annular gasket 110 that is disposed in a peripheral radially outwardly extending bead 112 in the housing 102. Therefore, because the radially inwardly extending flange portion 94 of the plunger 100 is sealably biased against the radially outwardly extending flange 92 on the spring retainer 90 and a radially inwardly extending flange portion 120 on the housing 102 is sealably biased against the face 74 on the cylinder head 16, the plunger 100 and housing 102 define a sealable variable volume pump chamber 121. It is to be noted that the flange portion 120 on the housing 102 is sealably connected to the valve guide 16 as by a press fit. Relative movement between the plunger 100 and housing 102 effects a change in the internal volume of the pump chamber 121 thereby first to induct an air-fuel mixture into the pump chamber 121 and subsequently inject the air-fuel mixture into the combustion chamber 17 of the internal combustion engine 12, as will be described.

The valve 22 is normally biased to the closed position with respect to its seat 56 in the manifold 16 by a valve spring 122. The valve spring 122 is of conventional construction and maintains a normal upward bias, as seen in the drawings, against the valve spring retainer 90 which is transmitted to the valve 22 through a pair of conventional split valve keepers 123 and 124 that are engageable with suitable annular ribs 126 and 128 on a terminal portion 50 of the valve stem 40. Because the valve 84 is affixed to the lower end portion 86 of the retainer 90, it also is normally biased to the closed condition by the spring 122. Further, the normal bias of the spring 122 tends to maximize the volume of the pump chamber 121 by moving the plunger 100 upwardly with respect to the housing 102. In addition, the spring 122 biases the flange 94 of the plunger 100 against the flange 92 on the retainer 90 and the flange 120 on the housing 102 against the face 74 on the cylinder head 16 thereby to effect a fluid seal therebetween, respectively.

The rocker arm 20 is engageable with the terminal portion 50 of the valve 22 in the conventional manner, counterclockwise rotation of the rocker arm 20 about the rocker arm shaft 18, as seen in the drawings, effecting a downward displacement of the valve 22 thereby to compress the spring 122. The valve 22 is biased upwardly to the closed condition by the spring 122 upon release of the bias of the rocker arm 20 on the valve 22.

An air-fuel mixture is admitted into the pump chamber 121 of the injector 10 from the carburetor 28 through a plate type inlet valve 150. As best seen in FIG. 6, the valve 150 is of generally rectangular configuration and is positioned and supported by an annular guide 152 that has a flat portion 153 at the bottom thereof to maintain the valve 150 in a predetermined orientation with respect to the housing 102 of the injector 10. The valve 150 is movable against a stop 154 defined by the housing 102 thereby to define the open position of the valve 150. It is to be noted that because the housing 102 is of circular horizontal cross section, the valve 150 is engageable with the stop 154 thereon in line engagement generally centrally of the valve 150.

As best seen in FIG. 6, the side wall of the housing 102 has a pair of circumferentially spaced horizontally aligned apertures 160 therein for the passage of an air-fuel mixture into the pump chamber 121 on the induction stroke of the injector 10, as will be described. Due to the flat rectangular configuration of the valve 150, engagement thereof with the stop 154 on the housing 102 maintains adequate clearance around the valve 150 for the passage of air-fuel mixture through the apertures 160 when the valve 150 is in the position shown in FIG. 4.

The valve 150 and annular valve guide 152 are supported by a complementary annular nipple 170 that is secured to the housing 102 as by welding. The nipple 170 has an annular radial flange portion 174 that defines a seat for the valve 150 (FIG. 4) when the valve 150 is biased thereagainst by a pressure differential across the valve 150 on the injection stroke of the injector 10.

Operation of the fuel injector 10 is initiated as the engine inlet valve 22 moves to the closed position at the end of what may be termed the induction stroke of the piston 15 of the engine 12. As the valve 22 moves upwardly under the bias of the spring 122, the plunger 100 moves upwardly within the housing 102 enlarging the pump chamber 121 and creating a partial vacuum therein that draws an air-fuel mixture from the carburetor 28 past the valve 150 and through the apertures 160 in the housing 102 into the pump chamber 121. The air-fuel mixture resides in the pump chamber 121 until the start of the next induction stroke of the piston 15.

As the engine inlet valve 22 begins to open under the bias of the rocker arm 20 on the induction stroke of the piston 15, the air-fuel mixture residing in the chamber 121 of the injector 10 is compressed due to downward movement of the plunger 100 within the housing 102. When the valve 84 on the lower end 86 of the retainer 90 is moved downwardly into the valve chamber 70 sufficiently to clear the bore 82 in the valve guide 60 (FIG. 3), the compressed air-fuel mixture is injected downwardly through the bore 82 and pump chamber 70, through the apertures 72 and passages 65, past the head 52 of the valve 22, and into the combustion chamber 17 of the engine 12. It is to be noted that the velocity of the air-fuel mixture upon injection is sufficient, due to compression thereof prior to opening of the valve 84, to effect injection of the air-fuel mixture into the combustion chamber 17 independently of air flow through the manifold 24 on the induction stroke of the piston 15. However, injection of the air-fuel mixture by the injection unit 10 is compatible and complementary to the induction of air through the manifold 24.

Power output of the engine 12 is controlled by, for example, varying the weight of fuel in the air-fuel mixture inducted into the pump chamber 121 of the injector 10 on the aforementioned closing stroke of the valve 22. The air-fuel mixture comprises a fixed air charge and a variable fuel charge as controlled by the needle valve 30 in the carburetor 28. Accurate metering of fuel by the mass flow of air through a carburetor is well known, inexpensive and relatively simple.

The weight of air inducted through the intake manifold 24 into the combustion chamber 17 on the induction stroke of the piston 15 is controlled by the butterfly valve 26 in the manifold 24. Therefore, because the valves 26 and 30 are interconnected by, for example, the mechanical linkage 34, a stoichiometric or otherwise desired ultimate air-fuel mixture can be achieved in the combustion chamber 17 at all power settings of the engine. Obviously, injection of the air-fuel mixture into the combustion chamber alleviates the aforementioned problem associated with operation of the engine 12 at low power settings. Velocity sufficient to preclude precipitation of the fuel droplets in the air-fuel mixture is imparted to the air-fuel mixture due to compression thereof within the pump chamber 121 of the injector 10 prior to injection of the mixture into the combustion chamber 17. Further, the aforementioned problem associated with high speed, high power operation of the engine 12, at which time relatively large volumes of air must be inducted through the manifold 24, is alleviated by enlarging the manifold 24 to optimum cross sectional dimensions without in any way compromising operation of the engine 12 at low power conditions.

Referring now to FIG. 6 of the drawings, a modified form of fuel system in accordance with the present invention comprises an air-fuel mixture injector 200 shown in operative association with an overhead cam-type of internal combustion engine 212. The engine 212 comprises a cylinder block 214, that in conjunction with a reciprocal piston 215 and a cylinder head 216, defines a combustion chamber 217. An overhead cam shaft 218 has a plurality of rotatable cams 220 thereon which, upon rotation, effect opening of an intake valve 222. The cam shaft 218 is driven as by a timing chain or suitable gears (not shown). The cylinder head 216 includes an intake manifold 224 that is vented directly to the atmosphere.

As discussed hereinbefore, the flow of air is under the control of suitable valve means, for example, a butterfly valve. An elementary carburetor having an adjustable fuel metering jet, for example, a needle valve, is connected to the air-fuel injector 200 as by suitable conduits. The butterfly valve and fuel-metering jet in the intake manifold and carburetor, respectively, are connected by, for example, a mechanical linkage that provides for control of the fuel system. Ignition of the air-fuel charge within the combustion chamber 217 is effected by a conventional spark plug 225.

The fuel injector 200 is shown operatively disposed in coaxial telescoping relationship about a stem portion 240 of the intake valve 222. A lower end portion 252 of the intake valve 222 is of conventional construction and has a truncated conical face 254 thereon for seating in a complementary valve seat 256 in the cylinder head 216.

In accordance with this embodiment of the present invention, the intake valve 222 is mounted for axial reciprocation within a central bore 258 of an elongated tubular valve guide 260. The valve guide 260 has a plurality of axially extending and circumferentially spaced grooves on the outer periphery of a cylindrical and lower end portion 263 thereof that, upon insertion of the valve guide 260 into a complementary bore 264 in the cylinder head 216, define a plurality of circumferentially spaced axially extending passages 265 extending parallel to and spaced radially outwardly of the central bore 258 therein. The passages 265 communicate with the intake manifold 224 immediately above the lower end 252 of the valve 222. The passages 265 also communicate with a valve chamber 270 in an enlarged cylindrical upper end portion 271 of the valve guide 260 through a like plurality of apertures 272. The apertures 272 communicate with the valve chamber 270 to provide for the passage of an air-fuel mixture downwardly and outwardly thereof into the longitudinal passage 265 within the lower end portion 263 of the valve guide 260.

The upper end portion 271 of the valve guide 260 has a bore 282 aligned with the bore 258 therein for the acceptance of a complementary annular sleeve or slide valve 284 that is disposed about an upper end 286 of the stem portion 240 of the valve 222. The slide valve 284 is secured to the valve 222 as by a press fit or a suitable pin or locking ring (not shown). The valve 284 is movable downwardly completely out of the bore 282 in the upper end portion 271 of the valve guide 260 thereby to provide clearance for the passage of an air-fuel mixture through the bore 282 into the valve chamber 270. When the valve 284 is in the position shown in FIG. 6, it effects a seal with respect to the bore 282 to preclude passage of the air-fuel mixture into the valve chamber 270.

A valve keeper spring 290 is disposed about the upper end of the valve guide 260 and extends between an end face 291 on the cylinder head 216 and a valve key keeper 292. The valve key keeper 292 is of conventional construction and normally retains a pair of valve keys 294 in engagement with the upper end portion 286 of the valve 222. A valve spring retainer 296 extends radially outwardly of the valve key keeper for engagement with the upper end portion of a valve spring 300. The valve spring 300 extends between the retainer 296 and the face 291 on the cylinder head 216. A shim 302 for valve clearance is interposed between the retainer 296 and an enveloping tappet 304.

The tappet 304 is of generally cup-shaped construction, the downwardly extending side walls 306 thereof being slidably accepted in a complementary cylindrical tappet guide 310. The tappet guide 310 is accepted in a bore 312 in the cylinder head 216 and is seated in, for example, a suitable annular recess 314.

The guide 310 has a threaded radial bore 320 therein for the acceptance of a plate valve support housing 322. The housing 322 has an inlet aperture 324 communicating with a pump chamber 325, defined by the guide 310, tappet 304 and cylinder head 216, and with a plate valve chamber 326 within which a plate valve 328, similar to the valve 150 discussed hereinbefore, is supported for reciprocal movement. A suitable end plug 330 closes the valve housing 322. The valve chamber 326 communicates with the pump chamber 325 when the valve 328 is in the position shown in FIG. 6.

Assuming for the purposes of discussion that the injector 200 is connected to the carburetor 28 in the manner of the injector 10 discussed hereinbefore, operation of the fuel injector 200 commences as the engine inlet valve 222 moves to the closed position at the end of what may be termed the induction stroke of the piston 215 of the engine 212. As the valve 222 moves upwardly under the bias of the spring 300, the enveloping tappet 304 moves upwardly within its guide 310, enlarging the pump chamber 325 and creating a partial vacuum therein that draws an air-fuel mixture from the carburetor 28 past the valve 328 into the pump chamber 325. It is to be noted that upward movement of the inlet valve 222 also carries the sleeve valve 284 into closed relation within the bore 282 in the valve guide 260. Therefore, the air-fuel mixture resides in the pump chamber 325 until the start of the next induction stroke of the piston 215.

As the engine inlet valve 222 begins to open under the bias of the cam 220 on the camshaft 218, the air-fuel mixture residing in the pump chamber 325 of the injector 200 is compressed due to downward movement of the enveloping tappet 304 within the guide 310. When the valve 284 on the stem portion 286 of the inlet valve 222 is moved downwardly into the valve chamber 270 sufficiently to clear the bore 282 in the valve guide 260, the compressed air-fuel mixture is injected downwardly through the bore 282 and pump chamber 270, through the apertures 272 and passages 265, past the head 252 of the valve 222 and into the combustion chamber 217 of the engine 212.

One outstanding benefit to be derived from a fuel system in accordance with the present invention is that, at the moment of release from the compression chamber of the injector, the rich air fuel ratio mixture is normally swept into the combustion chamber by the main supply of air through the intake manifold at the moment when this air is flowing at its peak velocity. This action alleviates one of the failings of the conventional fuel system in which fuel droplets coagulate during the low-velocity periods of air flow at the start and at the end of the induction stroke. There is no doubt that some of the larger droplet this formed, in fuel systems heretofore known and used, usually burn either late in the expansion stroke or even during the exhaust stroke. Upon burning, these large droplets generate only negligible useful work and add to the waste heat load.

From the foregoing description it should be apparent that a fuel system in accordance with the present invention regulates and balances the distribution of fuel to the engine in a manner that is relatively inexpensive, reliable and compact. The fuel system accurately meters and times the distribution of fuel to the engine so as to provide relatively smooth and economical operation at idle conditions and relatively powerful and economical operation at high power conditions.

It is to be understood that the specific construction of the improved automotive device herein disclosed and described is presented for the purpose of explanation and illustration and is not intended to indicate limits of the invention, the scope of which is defined by the following claims.

What is claimed is:

1. A fuel system for an internal combustion engine having a combustion chamber, said fuel system comprising an intake manifold for the induction of air into the combustion chamber, a pump chamber, means for inducting an air-fuel mixture into said pump chamber, means for compressing the air-fuel mixture within said pump chamber, and means for injecting the air-fuel mixture into the intake manifold upon induction of the air into the combustion chamber.

2. In an internal combustion engine comprising a combustion chamber with a reciprocable piston therein, an intake manifold for the induction of air, and an inlet valve between said manifold and combustion chamber, a fuel system comprising an annular air-fuel mixture injector disposed about a stem portion of the valve, means for inducting an air-fuel mixture into said injector, means for compressing the air-fuel mixture within said injector, and means for injecting the air-fuel mixture into the intake manifold behind the inlet valve.

3. In an internal combustion engine comprising a combustion chamber with a reciprocable piston therein, an intake manifold for the induction of air, and an inlet valve between said manifold and combustion chamber, a fuel system including an air-fuel mixture injector comprising a plunger movable with the valve within and with respect to a housing supported in fixed relation to the manifold, movement of the valve in one direction effecting movement of the plunger with respect to the housing of said injector to effect an increase in volume of said injector for inducting an air-fuel mixture into said injector, movement of the valve in the other direction compressing the air-fuel mixture within said injector, and means for injecting the air-fuel mixture into the intake manifold behind the inlet valve upon opening thereof.

4. In an internal combustion engine comprising a combustion chamber with a reciprocable piston therein, an intake manifold for the induction of air, and an inlet valve between said manifold and combustion chamber, a fuel system comprising an annular air-fuel mixture injector disposed about a stem portion of said valve, a carburetor having means for controlling the weight of fuel in an air-fuel mixture drawn therefrom, means for inducting an air-fuel mixture from said carburetor into said injector, means for compressing the air-fuel mixture within said injector, means for injecting the air-fuel mixture into air charge inducted through the manifold, and means for controlling the weight of air inducted through the manifold operatively connected to said fuel controlling means to produce a desired ultimate air-fuel mixture in the combustion chamber.

5. In an internal combustion engine comprising a combustion chamber with a reciprocable piston therein, an intake manifold, and an inlet valve between said manifold and combustion chamber, a fuel system including an annular air-fuel mixture injector disposed about a stem portion of the valve, said injector comprising a plunger movable with the valve and a housing supported in fixed relation to the manifold, movement of said valve to the closed condition effecting movement of the plunger with respect to the housing of the injector to increase the volume thereof to induct an air-fuel mixture into said injector, movement of the valve to the open condition decreasing the volume of said injector to compress the air-fuel mixture therein and inject the air-fuel mixture into the air intake manifold.

6. An air-fuel mixture injector for an internal combustion engine having a combustion chamber with a reciprocable piston therein, an intake manifold, and an inlet valve between said manifold and combustion chamber, said air-fuel mixture injector comprising a plunger engaged with the valve so as to be movable therewith, a housing supported in fixed relation to the manifold for the acceptance of said plunger, movement of the valve to the closed condition effecting movement of the plunger within the housing of the injector to increase the volume of said injector and induct an air-fuel mixture into said injector, movement of the valve to the open condition effecting a decrease in volume within said injector to compress the air-fuel mixture therein and inject the air-fuel mixture into the manifold for passage into the combustion chamber.

7. An air-fuel mixture injector for an internal combustion engine having a combustion chamber with a reciprocable piston therein, an intake manifold, and an inlet valve between said manifold and combustion chamber, said air-fuel mixture injector comprising a plunger engaged with the valve of the engine so as to be movable therewith, a housing supported in fixed relation to the engine manifold for the acceptance of the plunger of said injector, valve guide for the engine valve having a passage extending between and communicating with the housing of said injector and the manifold of the engine, movement of the valve to the closed condition effecting movement of the plunger within the housing of said injector to increase the volume of said injector and induct an air-fuel mixture into said injector, movement of the engine valve to the open condition effecting a decrease in volume within said injector to compress the air-fuel mixture therein and inject the air-fuel mixture through the passage in the valve guide and into the intake manifold for passage into the combustion chamber of the engine.

8. In an internal combustion engine having a combustion chamber, an intake manifold, a reciprocable engine inlet valve therebetween and a carburetor for producing an air-fuel mixture, the improvement comprising an air-fuel mixture injector comprising a plunger, a cylindrical housing supported in fixed relation to the engine for the acceptance of said plunger and defining a pump chamber, a valve guide for the engine inlet valve having a passage communicating with the pump chamber and with the intake manifold of the engine, an injector valve on the engine inlet valve for opening and closing said passage upon movement of the engine inlet valve to the open and closed condition, respectively, and means movable between an open and closed condition to control the flow of the air-fuel mixture from the carburator of the engine to the injector.

9. A fuel system for an internal combustion engine having an intake manifold and a combustion chamber comprising means for inducting a charge of air through the intake manifold into the combustion chamber of the engine, means for compressing and injecting an air-fuel mixture into the intake manifold of the engine, and means for controlling the richness of the air-fuel mixture.

10. In an internal combustion engine having an intake manifold for the induction of air, a combustion chamber, a reciprocable engine inlet valve therebetween and a carburetor for producing an air-fuel mixture, the improvement comprising an air-fuel mixture injector comprising a plunger, a cylindrical housing supported in fixed relation to the engine for the acceptance of said plunger and defining a pump chamber, a valve guide for the engine inlet valve having a passage communicating with the pump chamber and with the intake manifold of the engine, and an injector valve on the engine inlet valve for opening and closing said passage upon movement of the engine inlet valve to the open and closed condition, respectively, said injector valve being positioned so that the compressed air-fuel mixture from the pump chamber is released into the intake during the period of maximum flow velocity of the air from the intake manifold past the intake valve to the combustion chamber.

References Cited in the file of this patent

UNITED STATES PATENTS

| | | |
|---|---|---|
| 2,220,949 | Richards | Nov. 12, 1940 |
| 2,242,990 | Brown | May 20, 1941 |
| 2,793,628 | Floyd | May 28, 1957 |
| 2,799,257 | Stumpfig et al. | July 16, 1957 |
| 2,809,621 | Layne | Oct. 15, 1957 |